United States Patent

Alfing

Patent Number: 5,271,143
Date of Patent: Dec. 21, 1993

[54] METHOD OF MAKING A MULTIPIECE GIMBAL

[75] Inventor: Norman L. Alfing, Green Valley, Ariz.

[73] Assignee: Hughes Aircraft Company, Los Angeles, Calif.

[21] Appl. No.: 902,269

[22] Filed: Jun. 22, 1992

[51] Int. Cl.⁵ ............................................ F16M 11/12
[52] U.S. Cl. .................................... 29/525.1; 248/184
[58] Field of Search ..................... 248/177, 288.1, 184; 29/428, 525.1

[56] References Cited

U.S. PATENT DOCUMENTS

| 2,500,048 | 3/1950 | Stoiber | 248/184 |
| 3,931,947 | 1/1976 | Tagnon | 248/184 X |
| 4,951,521 | 8/1990 | Jacobson | 248/184 X |
| 5,143,334 | 9/1992 | Sardou et al. | 248/184 |

FOREIGN PATENT DOCUMENTS

| 121054 | 3/1946 | Australia | 248/184 |
| 1169879 | 9/1958 | France | 248/177 |

Primary Examiner—Timothy V. Eley
Attorney, Agent, or Firm—Randall M. Heald; Charles D. Brown; Wanda K. Denson-Low

[57] ABSTRACT

A gimbal (22) with three critical dimensions is prepared by separately fabricating three components of the gimbal (22), and then joining the components on tooling. The steps of the method include fabricating a base ring platform (50) while maintaining a platform height critical dimension, and fabricating two brackets (56), while maintaining the bracket pivot bore height as a critical dimension. The gimbal (22) is completed by assembling the base ring platform (50) and the two brackets (56) on a tool base with an arbor extending between the pivot bores (26) on the brackets (56), while maintaining a bracket separation critical dimension, and rigidly fixing the two brackets (56) to the base ring platform (50) with locating pins (64). Three critical gimbal dimensions are thereby obtained, while reducing the cost and complexity of fabrication.

13 Claims, 3 Drawing Sheets

METHOD OF MAKING A MULTIPIECE GIMBAL

BACKGROUND OF THE INVENTION

This invention relates to a precision gimbal such as that used in missile seeker systems, and, more particularly, to the fabrication of such a multipiece gimbal.

In some types of missile systems, a seeker or sensor is placed in the nose of the missile, covered by a transparent window. The sensor may be a visible-light, infrared, or radar sensor. The sensor views a scene generally forward of the missile, and provides images of the scene to an automated image processor or to an operator.

Although the sensor field of view is generally directed forwardly of the axis of the missile, it is desirable for some types of missiles and sensors to have the capability to direct the sensor field of view in off-axis directions, up to 20 degrees or more from the missile axis. To provide this capability, the sensor is mounted on a motor-driven gimbal that permits the sensor to rotate about the missile axis and pivot about a bore having a transverse axis. This combination of motions permits the sensor to be pivoted to view any axial or off-axis scene, up to the permitted rotational angle of the gimbal.

The gimbal is provided as an investment casting having a base and two side pieces through which the transverse bore is formed. The gimbal is final machined to extremely precise dimensional tolerances in three critical areas. The height of the transverse bore from the base, the angular misorientation of the transverse bore, and the separation of the side pieces must be held to small tolerances, so that the gimbal angular position can be established accurately.

It is difficult to obtain and then retain these accurate dimensional tolerances. The complex shape of the gimbal requires specialized final machining steps that are not in themselves difficult to perform, but are difficult to perform to the required tolerances. The dimensional tolerances are additive to some extent. Perhaps even more significant, when viewed in side elevation, the gimbal is generally U-shaped, with a flat base and the side pieces extending upwardly at a right angle. When the investment casting is machined, the removal of metal causes the regions to relax so that previously established dimensions change. These changes in dimensions continue as the part is heated and cooled, due to residual stresses and other effects in the part. These changes are not large, but can exceed the critical tolerances unless great care is taken in the casting, heat treating, and final machining operations.

The result of the highly exact dimensional tolerances is that the gimbal is expensive to produce. The yield of parts is relatively low, because one small out-of-tolerance condition in the latter stages of the final machining operation may result in scrapping of the entire piece. The more dimensions that must be maintained critical in any part, the more difficult is the part to fabricate. In this case, the U-shaped gimbal is difficult and expensive to produce due to the high precision required and inherent effects such as the residual stresses.

There is therefore a need for an improved approach to the gimbal used in missile sensor systems. Any improved approach must provide the same capabilities as does the present gimbal, but desirably is less expensive to produce and is more stable in use. The present invention fulfills this need, and further provides related advantages.

SUMMARY OF THE INVENTION

The present invention provides an improved approach to fabricating the gimbal structure. It achieves the same function and tolerances as does the prior approach, using the same materials. No changes in the sensor, motor, power feeds, or other structure are required. The cost of the gimbal produced by the present approach is about 1/20 of the cost of the prior gimbal.

In accordance with the invention, a method for preparing a gimbal comprises the steps of fabricating a base ring platform and fabricating two brackets, resulting in three separate pieces. The base ring platform and two brackets are assembled with tooling to have the required spacing and alignment, and the two brackets are rigidly fixed to the base ring platform.

In the preferred approach, the three individual pieces are each separately made of die cast and final machined aluminum alloy. They are separately final machined to each have a single critical tolerance: the base ring platform height and the heights of the transverse bores in the brackets must be maintained within tolerances. The separation of the side pieces and the bore alignment are established during the assembly operation, and can be verified prior to the final fixing of the side brackets to the base ring platform. All of the dimensions of the final assembly are checked to be certain that they meet the tolerances in the assembly on the tooling, and any piece found to be out of tolerance can be removed, discarded, and replaced by another similar piece. Once a fully satisfactory assembly is achieved, the side brackets are fixed to the base ring platform, preferably by pins and screws.

The gimbal produced by this process is unique, as it does not have the warping tendencies induced by residual stresses that are inherent in the single-piece device. Thus, further in accordance with the invention, a gimbal comprises a base ring platform having a central opening, the platform height being maintained to a critical tolerance and two oppositely disposed brackets having aligned gimbal bores therethrough, the bore height being maintained to a critical tolerance on each bracket. The brackets are joined to the base ring by pins and screws at a critical separation distance.

The gimbal structure produced by the present approach is fully compatible structurally and dimensionally with the gimbal structure of the prior single-piece approach. No changes in the supported sensor and other hardware are required. The present approach has the important advantage that each of the three separate pieces, the base ring platform and the two brackets, must each be final machined only to a single critical tolerance. The parts are individually less complex than the prior U-shaped piece, permitting the single critical tolerance of each piece to be achieved using relatively conventional final machining procedures. Moreover, the elimination of the one-piece U-shaped construction avoids the dimensional changes that result from relaxation of residual stresses and metal removal during machining. If a mistake is made on one of the pieces or it is out of tolerance, it can be discarded and replaced with a new piece, while retaining the other two acceptable pieces. The present approach also permits the three pieces to be initially cast using a high-rate, inexpensive casting process, die casting, due to their less-complex individual design than the prior single-piece gimbal.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
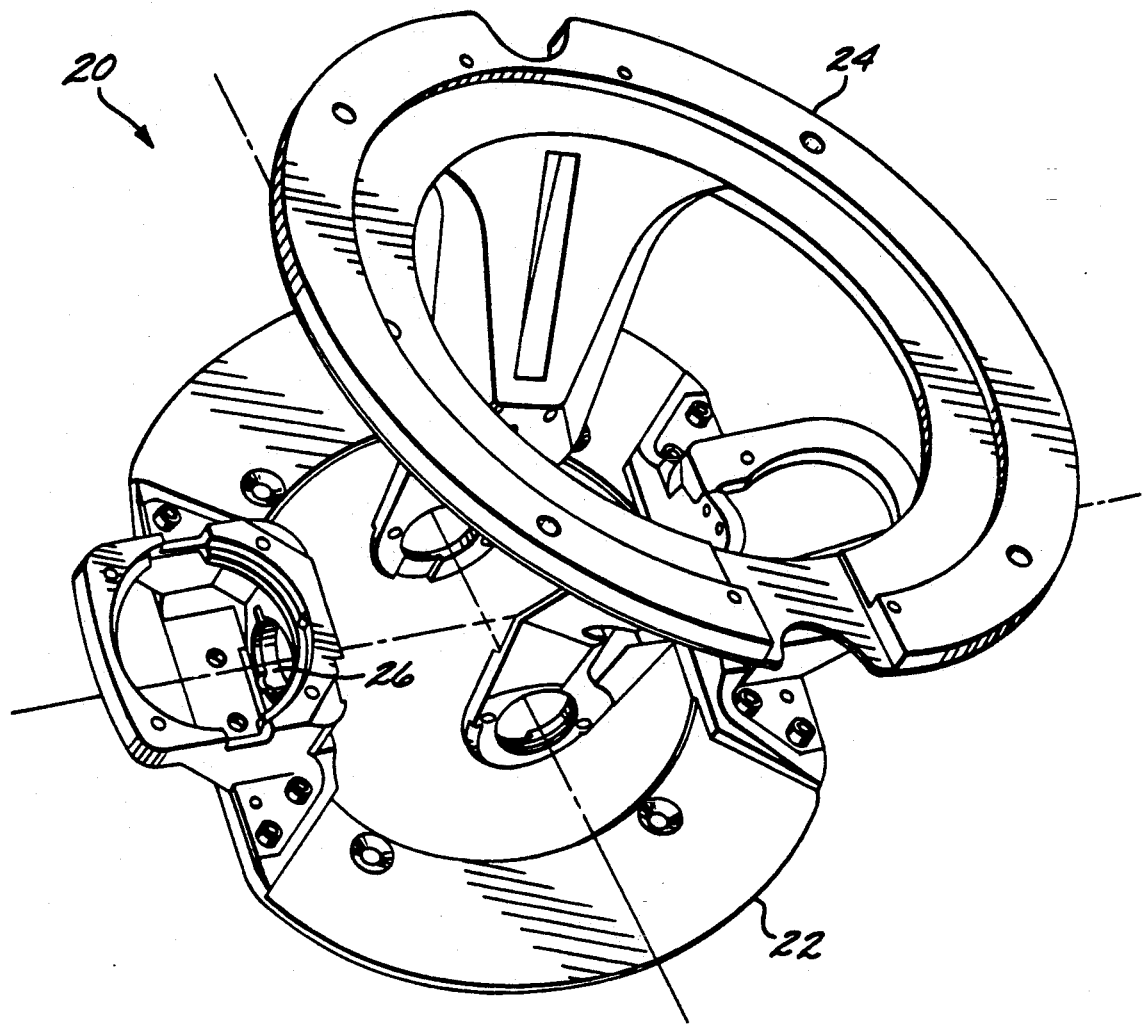
FIG. 1 is a schematic view of a sensor mounted in a gimbal.

FIG. 1 depicts a sensor mounting system 20 used in a missile sensor system. The mounting system 20 includes a gimbal 22 in which a sensor platform 24 is pivotably mounted through a transverse bore 26. (The sensor, not shown, is mounted on the sensor platform 24.) The gimbal 22 is rotationally mounted on a support (not shown). With this combination of rotational and pivotal mounting, the sensor 24 can be pointed in an arbitrarily selected direction within the pivoting limitations. In the prior approach, the gimbal 22 is cast and final machined as a single piece.

Figure 2:
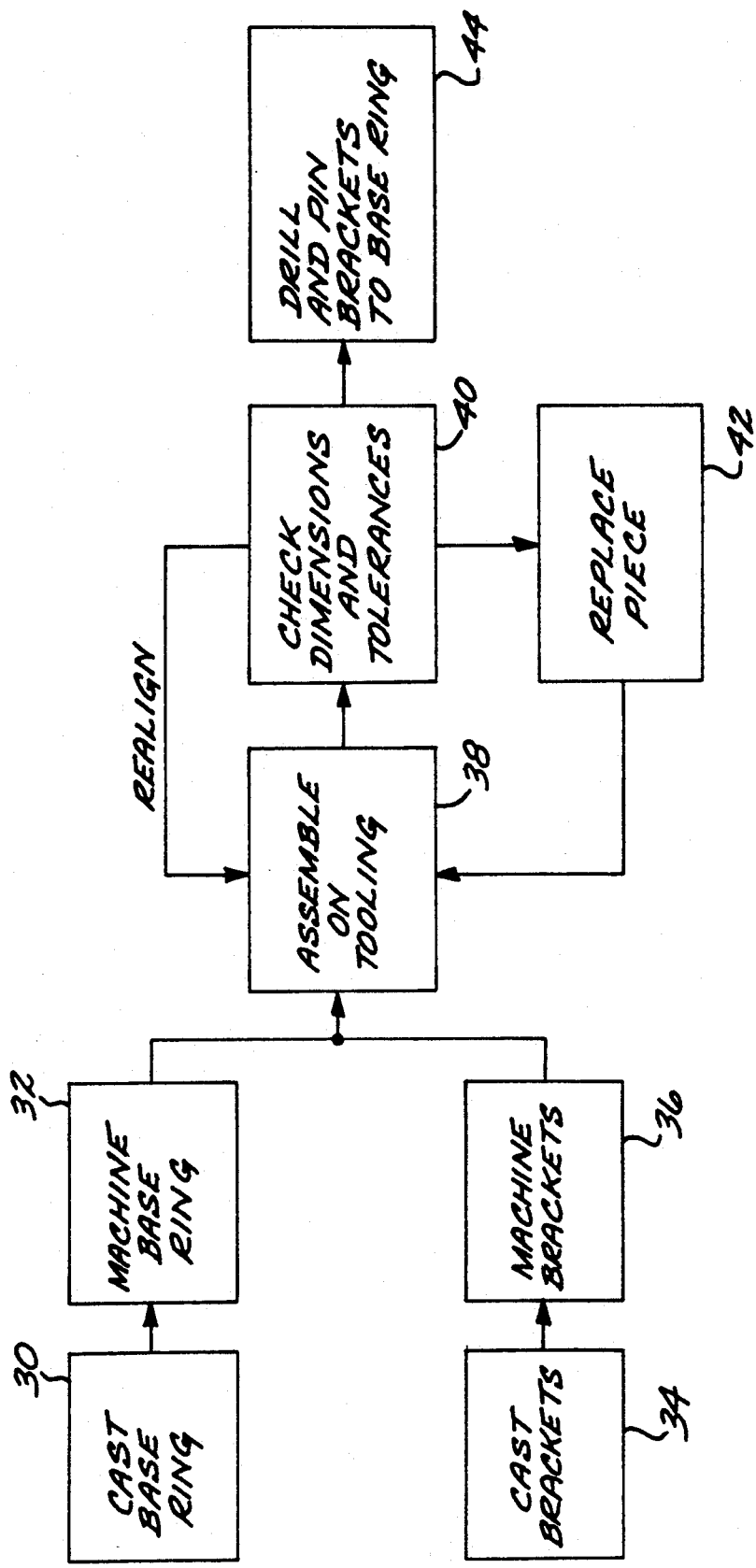
FIG. 2 is a process flow diagram for the preparation of the gimbal according to the present approach.
Figure 3:
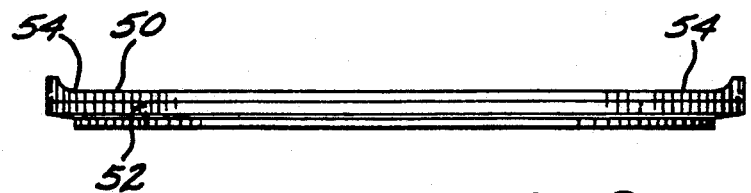
FIG. 3 is an elevational view of the base ring.
Figure 4:
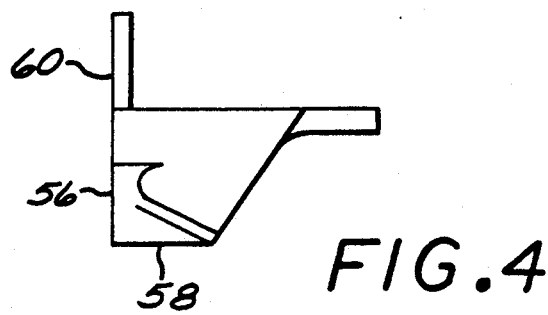
FIG. 4 is an elevational view of one of the brackets.
Figure 5:
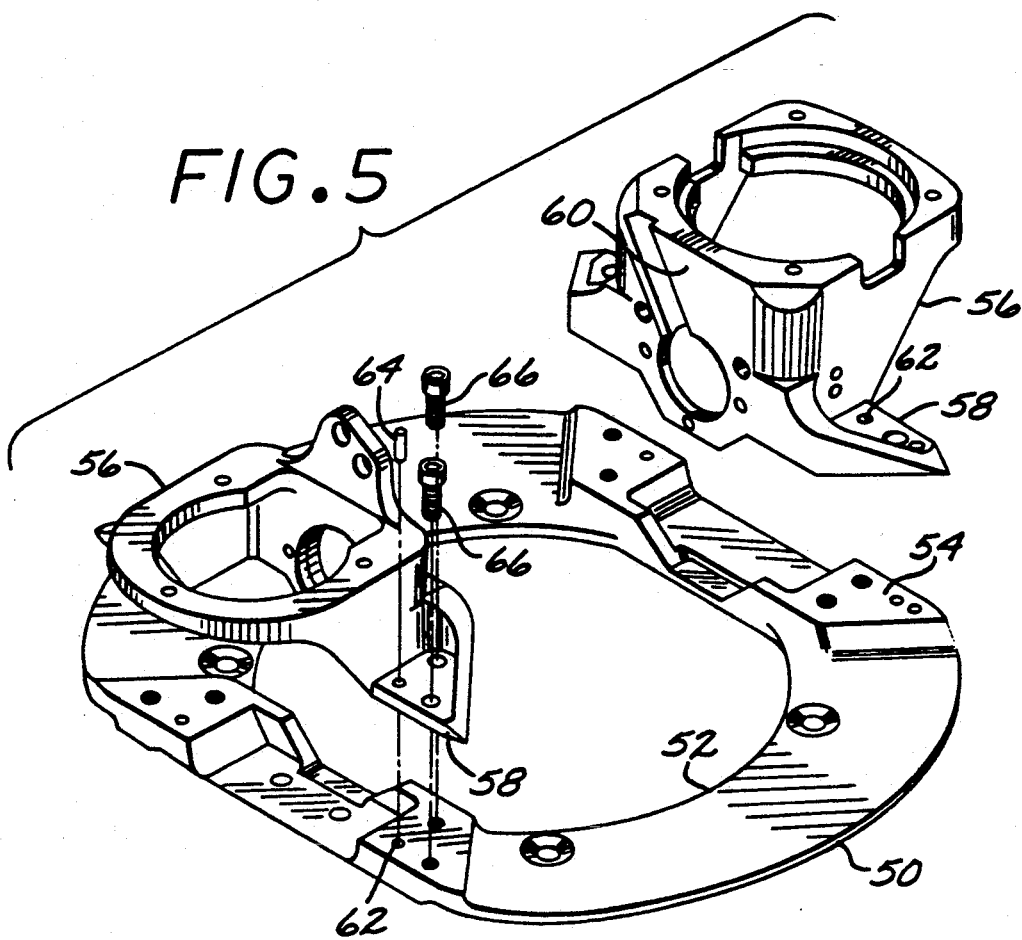
FIG. 5 is an exploded perspective view of the gimbal of the invention.

In the present approach, a gimbal is manufactured from three separate pieces to have three critical dimensions: the position of the gimbal pivot bores, the angular orientation of the gimbal pivot bores, and the separation of the gimbal pivot bores. Each of the pieces itself has only one critical dimension, however. FIG. 2 illustrates the process for manufacturing the gimbal 24, FIG. 3 illustrates the base ring after fabrication, FIG. 4 illustrates one of the brackets after fabrication and FIG. 5 illustrates the gimbal assembly in exploded view.

A base ring platform 50 is cast, numeral 30 of FIG. 2, preferably by die casting. The base ring platform 50 in a thin solid annular piece with a central opening 52 therein. Two fastening locations 54 are provided at diametrically opposed positions. The base ring platform 50 is final machined, numeral 32 of FIG. 2. In the casting 30 and final machining 32, the only dimension that must be maintained to exact tolerance is the thickness of the base ring platform 50 in the fastening locations 54. This is relatively easy to do, since it requires only that the ring platform 50 be kept at a constant thickness.

Separately, two brackets 56 are cast, numeral 34 of FIG. 2, preferably by die casting. The brackets 56 are of a generally right-angled form, with a base 58, a side wall 60 extending perpendicular to the base 58, and the transverse bore 26 through the side wall 60. The two brackets are identical in these respects but differ slightly in other details not pertinent to the present invention, and are therefore not precisely identical. The brackets 56 are final machined, numeral 36 of FIG. 2. In the casting 34 and final machining 36, the only dimension that must be maintained to exact tolerance is the distance from the bottom of the base 58 to the centerline of the bore 26. This tolerance is relatively easy to maintain using conventional machine tools.

The base ring platform 50 and the brackets 56 are formed of any appropriate material. In the preferred approach, they are cast of aluminum-base alloys and then machined. Alternatively, they may be machined from wrought stock that has been annealed. The preferred material of construction is A380 aluminum casting alloy, and an alternative material is 6061-T651 wrought alloy.

The base ring platform 50 and brackets 56 are assembled together on an appropriate piece of tooling (not shown), numeral 38 of FIG. 2. The tooling holds the base ring platform 50 at a fixed location using locating pins, and the brackets 56 are held in position with clamps. A pin or arbor is inserted through the two bores of the brackets 56 to align the bores 26. The separation of the brackets is controlled by flats machined on the tooling and is adjusted until it reaches the required dimension, within the required tolerances.

After assembly 38, all dimensions are checked to be certain that they are within tolerances, numeral 40. If the dimensions are not within tolerances, the clamping is loosened and the parts are reassembled, numeral 38 and rechecked, numeral 40. If after several attempts it is concluded that the required dimensions cannot be attained, the part that causes the problem is identified, discarded, and replaced, numeral 42 of FIG. 2. (It will be appreciated that this discarding and replacing of component parts, numeral 42, rarely occurs with the present design due to the individual simplicity of the assembled parts.) The pieces are reassembled, numeral 38, and rechecked, numeral 40, until a satisfactory gimbal structure is reached. This approach is to be constrasted with the prior one-piece technique, where the entire expensive part must often be discarded when one of the tolerances is not met.

The assembled, checked, and clamped pieces are then rigidly fixed together. The preferred approach is to fix the pieces together by pins and screws, numeral 44 of FIG. 2. In the preferred approach, three holes 62 are drilled through each side of the base 58 of the bracket 56 and the corresponding portion of the base ring platform 50. One of each set of holes 62 is reamed to a precision alignment, and a locating pin 64 is driven into place. The two locating pins 64 of each bracket 56 prevent the bracket 56 from sliding or rotating with respect to the base ring platform 50. Attachment screws 66 are positioned in the other two holes. The attachment screws 66 prevent the bracket 56 from lifting off from the base ring platform 30 and from tilting. Joining by techniques such as welding, soldering, bonding, or brazing is possible but not preferred, due to the possibility for warping the structure.

Tests have demonstrated that the resulting structure of the gimbal 22 made by this buildup approach is as rigid and suitable for pivotably supporting the sensor platform 24 and sensor as is the structure of the prior approach. The present approach produces the gimbal at a piece cost of about 1/20 of that of the prior approach, due to the use of die casting, reduced machining requirements for critical structures, opportunity to machine multiple parts simultaneously, and ease of repair during assembly by replacement of a nonconforming part before final pinning.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a gimbal, comprising the steps of:

fabricating a base ring platform;

fabricating two brackets separately from the base ring platform;

assembling the base ring platform and the two brackets using tooling to establish a preselected separation and alignment of the two brackets; and rigidly fixing the two brackets to the base ring platform.

2. The method of claim 1, wherein the base ring and the two brackets are made of an aluminum alloy.

3. The method of claim 1, wherein the base ring platform is fabricated by die casting and machining.

4. The method of claim 1, wherein the brackets are formed by die casting and machining.

5. The method of claim 1, wherein one of the brackets is replaced by another bracket before performing the step of rigidly fixing the two brackets to the base ring platform.

6. The method of claim 1, wherein the base ring platform height is maintained to a critical dimension during the step of fabricating a base ring.

7. The method of claim 1, wherein each bracket has a bracket pivot bore whose height is maintained to a critical dimension during the step of fabricating two brackets.

8. The method of claim 7, wherein during the step of assembling an arbor is placed between the pivot bores and a separation distance between the brackets is maintained to a bracket separation critical dimension.

9. A method for preparing a gimbal having three critical dimensions, the position of the gimbal pivot bores, the angular orientation of the gimbal pivot bores, and the separation of the gimbal pivot bores, the method comprising the steps of:

fabricating a base ring platform while maintaining a platform height critical dimension;

fabricating two brackets each having a bracket pivot bore, while maintaining a bracket pivot bore height critical dimension;

assembling the base ring platform and the two brackets on a tool base with an arbor extending between the pivot bores on the brackets, while maintaining a bracket separation critical dimension; and rigidly fixing the two brackets to the base ring platform with pins.

10. The method of claim 9, wherein the base ring and the two brackets are made of an aluminum alloy.

11. The method of claim 9, wherein the base ring platform is fabricated by die casting and machining.

12. The method of claim 9, wherein the brackets are formed by die casting and machining.

13. The method of claim 9, wherein one of the brackets is replaced by another bracket before the step of rigidly fixing.

* * * * *